United States Patent
Igawa et al.

(10) Patent No.: US 7,163,024 B2
(45) Date of Patent: Jan. 16, 2007

(54) FLOW CONTROL VALVE AND FLOW CONTROL DEVICE

(75) Inventors: Akinori Igawa, Hino (JP); Shoji Takemoto, Hono (JP)

(73) Assignee: Toflo Corporation, Tokyo (JP)

( * ) Notice: Subject to any disclaimer, the term of this patent is extended or adjusted under 35 U.S.C. 154(b) by 229 days.

(21) Appl. No.: 11/004,258

(22) Filed: Dec. 3, 2004

(65) Prior Publication Data

US 2005/0145278 A1  Jul. 7, 2005

(30) Foreign Application Priority Data

Jan. 6, 2004 (JP) ............... 2004-001131

(51) Int. Cl.
G05D 7/06 (2006.01)
F16K 31/126 (2006.01)

(52) U.S. Cl. ............... 137/486; 137/487.5; 251/61.2; 251/61.5; 92/97

(58) Field of Classification Search ............... 137/486, 137/487.5; 251/61, 61.2, 61.5; 92/97
See application file for complete search history.

(56) References Cited

U.S. PATENT DOCUMENTS

| 3,310,282 A | 3/1967 | Boteler |
| 4,304,390 A | 12/1981 | Kawabata et al. |
| 4,697,616 A * | 10/1987 | Ashcroft ............... 137/486 |
| 5,678,601 A * | 10/1997 | Engel ............... 137/486 |
| 5,829,473 A * | 11/1998 | Hajbi et al. ............ 137/315.28 |
| 6,776,180 B1 * | 8/2004 | Yonnet ............... 137/14 |
| 6,866,061 B1 * | 3/2005 | Ye et al. ............... 137/487.5 |

FOREIGN PATENT DOCUMENTS

| DE | 2 319 751 | 11/1973 |
| DE | 24 31 442 A1 | 1/1975 |
| GB | 1 413 928 | 5/1974 |

* cited by examiner

Primary Examiner—Ramesh Krishnamurthy
(74) Attorney, Agent, or Firm—Norris McLaughlin & Marcus PA (57) ABSTRACT

There are provided a flow control valve and a flow control device suitable for allowing flow control of a fluid with high accuracy. Diaphragms 8 and 9 are mounted to upper and lower openings, respectively, of an air chamber 6. The upper diaphragm 8 and the lower diaphragm 9 are connected by a connecting shaft 10 and have pressurized surfaces with different areas that receive pressure of the air chamber 6. This causes a difference between forces applied to the two diaphragms 8 and 9, and the difference causes the connecting shaft 10 and a valve body 2 mounted to an outer surface of the lower diaphragm 9 to slide and be separated from a valve seat 23.

18 Claims, 6 Drawing Sheets

PRIOR ART

FLOW CONTROL VALVE AND FLOW CONTROL DEVICE

BACKGROUND OF THE INVENTION

1. Field of the Invention

The present invention relates to a flow control device and a flow control valve included in the flow control device used for a variety of devices that suitably control a flow rate of a fluid to supply the fluid, such as a flow control unit or the like in a semiconductor manufacturing apparatus.

2. Description of the Related Art

Figure 6:
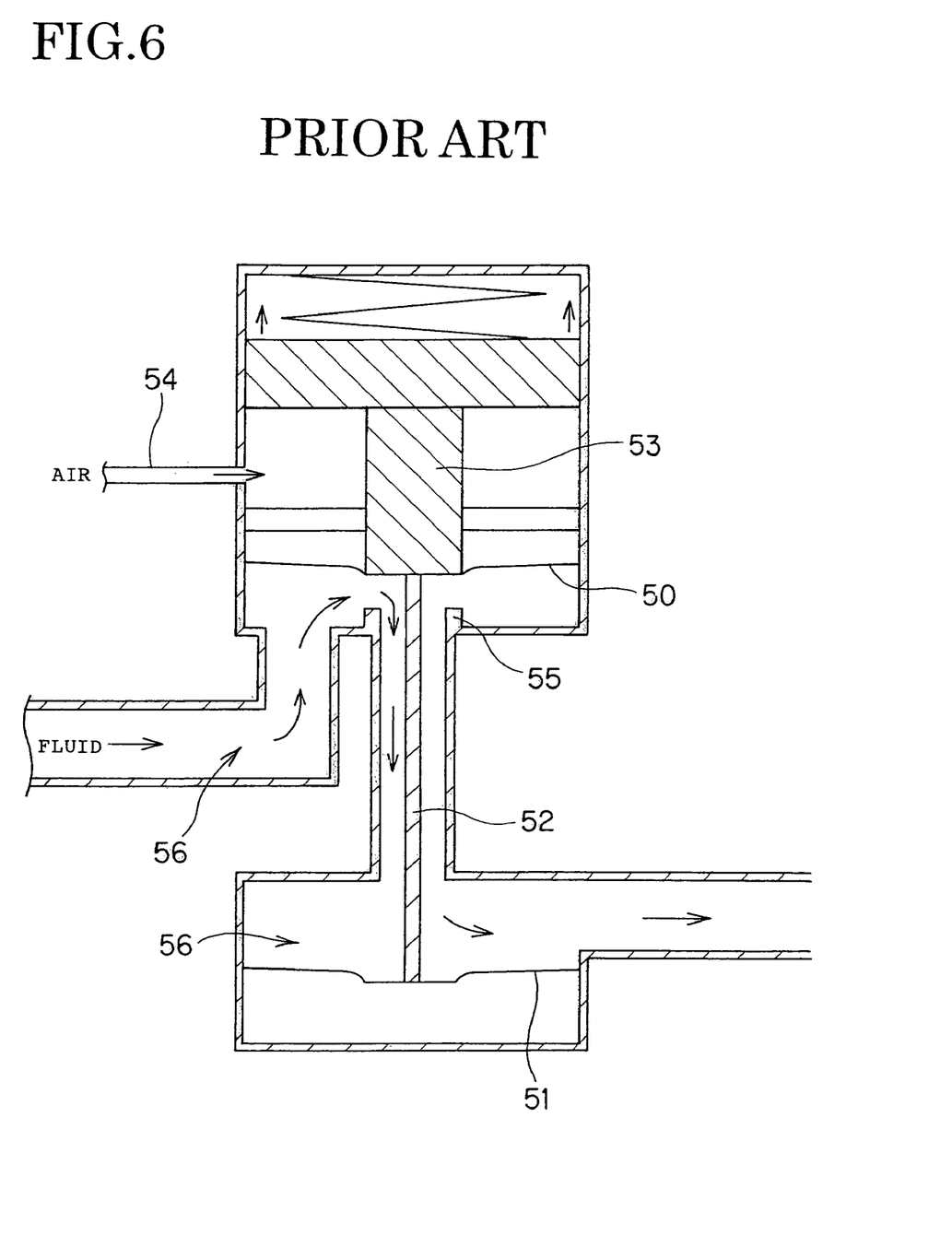
FIG. 6 illustrates a conventional flow control valve.

A known flow control valve is a diaphragm valve disclosed in Japanese Patent Laid-Open No. 2003-185053. The diaphragm valve in Japanese Patent Laid-Open No. 2003-185053 has a structure in which two upper and lower diaphragms 50 and 51 are connected by a link rod 52, and a piston 53 is connected to the upper diaphragm 50. When the piston 53 is moved upward by pressure of air from air supply piping 54, the movement of the piston 53 causes the upper diaphragm 50 to be deformed and separated from a valve seat 55 to open a channel 56 through which a fluid flows.

The diaphragm valve in Japanese Patent Laid-Open No. 2003-185053, however, has the structure in which the pressure of the air from the air supply piping 54 is applied to the piston 53 to deform the upper diaphragm 50, and thus an amount of change in the pressure when the pressure of the air is changed is directly reflected in an amount of deformation of the upper diaphragm 50 and an amount of separation from the valve seat 55, thereby making it difficult to finely adjust the amount of separation of the upper diaphragm 50 from the valve seat to hinder a flow adjustment with high accuracy. Because the diaphragm valve itself has low flow adjustment accuracy, flow control of a fluid with high accuracy cannot be expected in a flow control device using such a diaphragm valve.

Another known flow control valve is a pilot regulator used in a pure water flow control device disclosed in Japanese Patent Laid-Open No. 11-161342. The pilot regulator has a structure in which a valve body is connected to a diaphragm, and when operating pressure causes the diaphragm to be vertically displaced, the valve body vertically moves integrally with the diaphragm. Thus, in the pilot regulator, an amount of change in the operating pressure for vertically displacing the diaphragm is directly reflected in an amount of displacement of the diaphragm and an amount of vertical movement of the valve body, thereby hindering a flow adjustment with high accuracy like the flow control valve in Japanese Patent Laid-Open No. 2003-185053. Because the pilot regulator itself has low flow adjustment accuracy, flow control of a fluid with high accuracy cannot be expected in a flow control device using such a pilot regulator.

SUMMARY OF THE INVENTION

The present invention is achieved in view of the above described circumstances, and has an object to provide a flow control valve and a flow control device suitable for allowing flow control of a fluid with high accuracy.

In order to achieve the above described object, the flow control valve according to the invention includes: an air chamber having two openings opposite each other; two diaphragms mounted to the openings of the air chamber and having pressurized surfaces with different areas that receive pressure of the air chamber; a connecting shaft that connects the two diaphragms; support means that supports the connecting shaft slidably in an axial direction; an internal channel that is provided outside the air chamber and through which a fluid flows; a valve body that slides in conjunction with the sliding operation of the connecting shaft to increase or decrease a flow rate of the fluid flowing through the internal channel; and an air supply passage that supplies air whose pressure or flow rate is controlled into the air chamber, wherein the air supply passage is divided at one end thereof into two branch duct lines, one of the two branch duct lines opens at an outlet thereof so as to face the pressurized surface of one of the diaphragms in close proximity, and the other of the branch duct lines opens at an outlet thereof so as to face the pressurized surface of the other of the diaphragms in close proximity.

The flow control valve according to the invention includes a structure in which the air chamber has two upper and lower openings, and the two diaphragms are placed on the upper and lower openings, that is, the structure in which the two diaphragms are vertically opposite each other, but the structure is not limited to such a positional relationship of the two diaphragms.

For example, the flow control valve according to the invention may have a structure in which two openings opposite each other are formed laterally of an air chamber, and diaphragms are mounted to the two right and left openings, respectively, so that the diaphragms are laterally opposite each other, or may be adapted so that two diaphragms are opposite each other in other directions.

In the flow control valve according to the invention, the pressure of the air supplied into the air chamber acts on the two diaphragms having the different pressurized areas. At this time, the difference between the areas of the pressurized surfaces of the diaphragms cause a difference between forces applied to the diaphragms. The differential force, that is, the force obtained by subtracting a force applied to the diaphragm having a smaller pressurized area from a force applied to the diaphragm having a larger pressurized area, acts on a connection structure constituted by the upper and lower diaphragms and the connecting shaft to deform and displace the connection structure. The deforming and displacing operation is such that the diaphragm having the larger pressurized area is deformed and displaced so as to protrude toward the outside of the air chamber, the deformation of the diaphragm causes the connecting shaft to slide, and the diaphragm having the smaller pressurized area is deformed and displaced toward the inside of the air chamber via the connecting shaft. Simultaneously with the deforming and displacing operation, the valve body slides in conjunction with the sliding operation of the connecting shaft to increase or decrease the flow rate of the fluid flowing through the internal channel.

As described above, the flow control valve according to the invention has the structure in which the difference between the forces applied to the two diaphragms causes the valve body to slide, thereby increasing resolution of a slide stroke of the valve body and allowing a flow adjustment with high accuracy.

The flow control valve according to the invention has a simple structure in which no isolated wall by means of an O-ring or the like is formed in the air chamber unlike a general air valve or the like, and the connecting shaft of the diaphragms is supported by a sliding bearing in the air chamber, and is inexpensive.

In the flow control valve according to the invention, the two diaphragms having the different pressurized areas opposite each other are used, but an outer surface of the diaphragm having the smaller pressurized area may be placed so as to face the internal channel. Such a configuration has an advantage that pressure of the fluid acts on the pressurized surface of the diaphragm having the smaller pressurized area to reduce an influence of the pressure of the fluid, as compared with a configuration using diaphragms having the same pressurized areas.

In order to achieve the above described object, the flow control device according to the invention includes: a duct line that supplies a fluid; a flow control valve placed in the middle of the duct line; a flowmeter that measures a flow rate of the fluid passing through the duct line; and a control unit that controls the flow control valve based on a flow measurement value measured by the flowmeter and a flow set value to adjust the flow rate of the fluid flowing through the duct line so as to match the flow set value, wherein the flow control valve includes: an air chamber having two openings opposite each other; two diaphragms mounted to the openings of the air chamber and having pressurized surfaces with different areas that receive pressure of the air chamber; a connecting shaft that connects the two diaphragms; support means that supports the connecting shaft slidably in an axial direction; an internal channel that is provided outside the air chamber and communicates with the duct line and through which the fluid flowing through the duct line flows; a valve body that slides in conjunction with the sliding operation of the connecting shaft to increase or decrease a flow rate of the fluid flowing through the internal channel; and an air supply passage that supplies air whose pressure or flow rate is controlled into the air chamber, wherein the air supply passage is divided at one end thereof into two branch duct lines, one of the two branch duct lines opens at an outlet thereof so as to face the pressurized surface of one of the diaphragms in close proximity, and the other of the branch duct lines opens at an outlet thereof so as to face the pressurized surface of the other of the diaphragms in close proximity.

The flow control device according to the invention uses the flow control valve according to the invention, thereby of course allowing flow control of the fluid with high accuracy. In addition, the flow control device according to the invention controls the flow control valve based on the present flow measurement value flowing through the duct line to adjust the flow rate of the fluid constant so as to match the flow set value, and thus has an advantage that a change in the flow rate of the fluid caused by factors other than the flow rate can be sufficiently accommodated.

The flow control valve included in the flow control device according to the invention also includes a structure in which the two diaphragms are vertically opposite each other, but the structure is not limited to such a positional relationship of the two diaphragms. When the two diaphragms are vertically opposite each other, one of the two branch duct lines formed by one divided end of the air supply passage opens at the outlet thereof so as to face the pressurized surface of the upper diaphragm in close proximity, and the other of the branch duct lines opens at the outlet thereof so as to face the pressurized surface of the lower diaphragm in close proximity.

In the flow control valve or the flow control device according to the invention, the two diaphragms and the connecting shaft may be configured as an integral part or separate parts. The diaphragms and the connecting shaft may be made of fluorocarbon polymer or other resin, or metal.

In the flow control valve or the flow control device according to the invention, the support means that slidably supports the connecting shaft may include, for example, a bearing such as a sliding bearing or a rolling bearing. Alternatively, support means that is not included in a general concept of a bearing, for example, a cylindrical part into which the connecting shaft is inserted may slidably support the connecting shaft.

The sliding bearing used as the support means provides little sliding resistance of the connecting shaft and allows position control of the valve body with high accuracy by minute air pressure, which is suitable for a flow adjustment with high accuracy.

Further, the support means includes means for supporting the shaft in a noncontact manner such as a magnetic bearing. Thus, noncontact support means such as the magnetic bearing may slidably support the connecting shaft.

In the flow control valve or the flow control device according to the invention, the "valve body" may be adapted so as to be integrally mounted to an outer surface of one of the two diaphragms, for example, the lower diaphragm when the two diaphragms are vertically placed, and the "internal channel" may be adapted to pass through the outer surface of the lower diaphragm to which the valve body is mounted.

In such a configuration, the outer surface of one lower diaphragm only comes into contact with the fluid flowing through the internal channel. Thus, even when the lower diaphragm is made of a material subject to corrosion such as metal, a fluorocarbon polymer coating as corrosion-resistant means may be applied to the outer surface only of the lower diaphragm. Even if an inner surface of the lower diaphragm or inner and outer surfaces of the upper diaphragm are made of metal, these surfaces are in no danger of coming into contact with the fluid, and thus there is no need to apply such corrosion-resistant means to the surfaces. This can reduce man-hours in manufacturing such a flow control valve and manufacturing costs.

The fluorocarbon polymer is used as an example of the corrosion-resistant means, and the outer surface of the diaphragm may be protected by other corrosion-resistant materials as the corrosion-resistant means.

In the flow control device according to the invention, "controlling the flow control valve based on the flow measurement value measured by the flowmeter and the flow set value to adjust the flow rate of the fluid flowing through the duct line so as to match the flow set value" may include that the present flow measurement value measured by the flowmeter is input to a controller, the controller compares the flow measurement value with the flow set value, and performs a PID operation relative to a deviation between the values to output a control signal to an air control unit, and based on the control signal, the air control unit controls the pressure or the flow rate of the air and supplies the air to the air chamber.

In the flow control device according to the invention, the "flowmeter" may be an ultrasonic flowmeter, and the ultrasonic flowmeter may be placed downstream of the flow control valve. In this case, apart of the duct line downstream of the flow control valve may be an ultrasonic propagation path of the ultrasonic flowmeter.

Such a configuration has an advantage that even if the lower diaphragm is damaged in the case where the internal channel passes through the outer surface of the lower diaphragm, the damage of the diaphragm can be detected at an early stage. The ultrasonic flowmeter has a function of raising an alarm about abnormal measurement when the measurement cannot be performed, and this function is used to obtain the advantage. Specifically, the lower diaphragm is damaged, the air in the air chamber leaks from the damaged portion into the internal channel, and bubbles of the leaking air enter the fluid whose flow rate is to be measured. The bubbles prevent ultrasonic propagation by the ultrasonic flowmeter and thus measurement, and the alarm about the abnormal measurement is then raised, thereby allowing an abnormality in the diaphragm to be immediately detected.

For the "flowmeter", flowmeters of the type other than the ultrasonic flowmeter may be used.

In the flow control device according to the invention, "the duct line that supplies the fluid" may be adapted to be a duct line constituted by a tube made of fluorocarbon polymer such as PFA, polyvinyl chloride, or rubber, a steel pipe, or a pipe made of other materials.

When the invention is used in a semiconductor manufacturing apparatus, the flow control valve or the flow control device according to the invention is used for controlling a flow rate constant of a fluid such as a cleaning fluid, pure water to be mixed with the clean water, or a liquid chemical. When the invention is used in chemical and pharmaceutical manufacturing fields, the flow control valve or the flow control device according to the invention is used for controlling a flow rate constant of a fluid such as a chemical solution.

The flow control valve according to the invention may be used for controlling the nature of a fluid such as a concentration, resistance, pressure or a temperature of the fluid. For example, when a stock solution of a chemical solution and a diluting fluid are supplied to a mixing tank to generate a chemical solution of a predetermined concentration, the concentration of the mixed solution may be detected by a sensor in the mixing tank, and the flow control valve according to the invention may be driven based on a detection value of the sensor to adjust an amount of the stock solution or the diluting fluid to be supplied to the mixing tank.

According to the flow control valve of the invention, the following operational advantages can be obtained.
(1) A flow control valve that allows a flow adjustment with high accuracy may be provided.
(2) An inexpensive flow control valve having a simple structure may be provided.

According to the flow control device of the invention, the following operational advantages can be obtained.
(1) Flow control of a fluid may be performed with high accuracy.
(2) A change in a flow rate of a fluid caused by factors other than the flow rate may be sufficiently accommodated.

DETAILED DESCRIPTION OF THE PREFERRED EMBODIMENTS

Now, a preferred embodiment of the invention will be described in detail with reference to the accompanying drawings.

Figure 1:
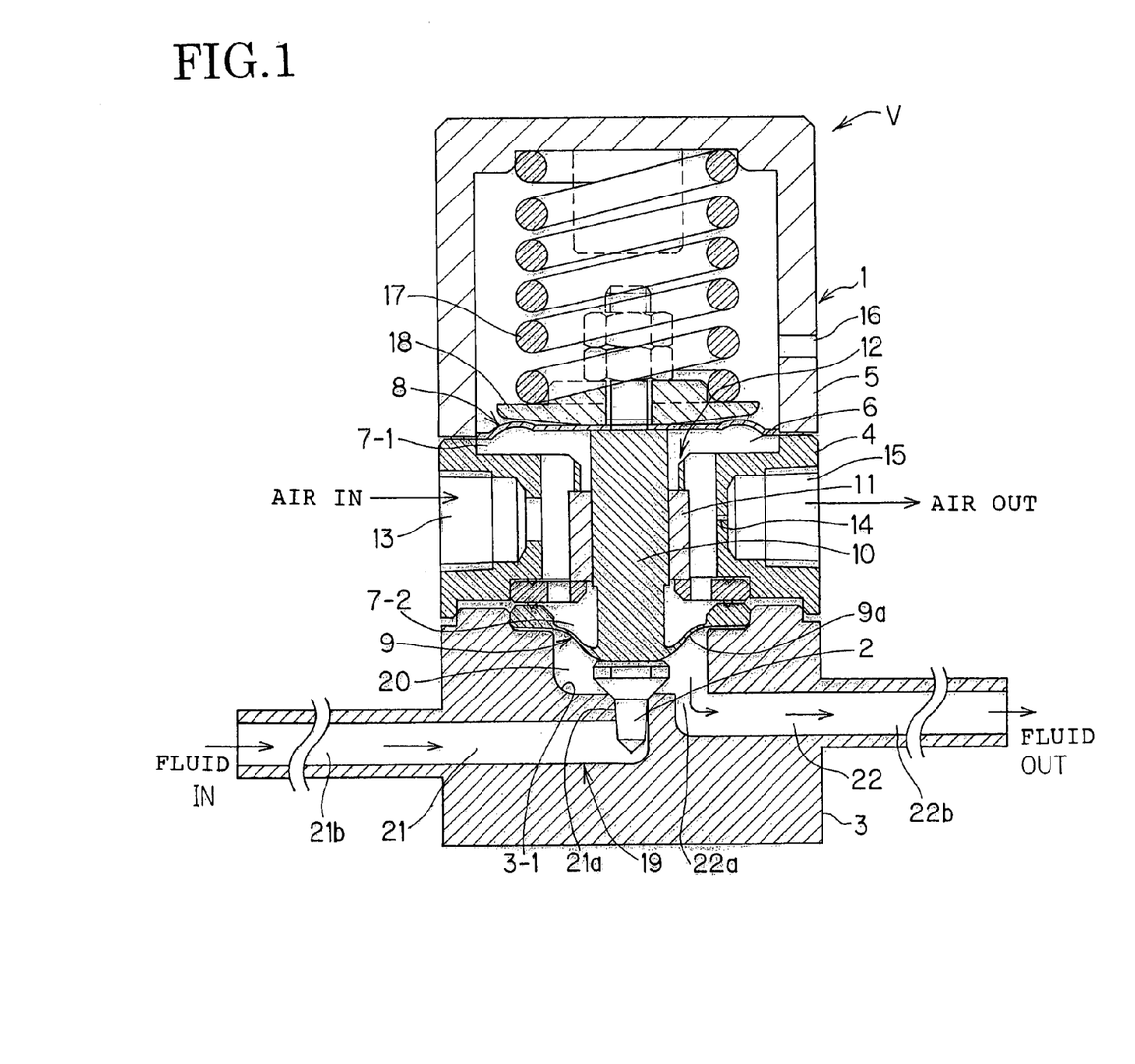
FIG. 1 is a sectional view of a flow control valve according to an embodiment of the invention.

A flow control valve V in FIG. 1 includes a valve housing 1 that houses valve components such as a valve body 2. The valve housing 1 according to the embodiment includes a valve base 3 placed in a lower portion, a valve cap 5 placed in an upper portion, and a cylindrical middle housing 4 placed between the valve base 3 and the valve cap 5.

A cylindrical inner space of the middle housing 4 is provided as an air chamber 6. The air chamber 6 has two vertically opposite openings 7-1 and 7-2. A first diaphragm 8 is mounted to the upper opening 7-1 of the air chamber 6, a second diaphragm 9 is mounted to the lower opening 7-2 of the air chamber 6, and the two vertical diaphragms 8 and 9 close the upper opening 7-1 and the lower opening 7-2, respectively, of the air chamber 6.

Herein, the first diaphragm 8 that closes the upper opening 7-1 of the air chamber 6 is referred to as "an upper diaphragm", and the second diaphragm 9 that closes the lower opening 7-2 of the air chamber 6 is referred to as "a lower diaphragm".

The upper diaphragm 8 and the lower diaphragm 9 have different diameters, and in the flow control valve V according to the embodiment, the upper diaphragm 8 has a larger diameter than the lower diaphragm 9.

Specifically, the upper diaphragm 8 is formed to have substantially the same diameter as an inner diameter of the valve cap 5. The opening 7-1 at an upper end of the air chamber 6 to which the upper diaphragm 8 is mounted is also adapted to open with a large diameter substantially the same as the inner diameter of the valve cap 5 like the diameter of the upper diaphragm 8.

On the other hand, the lower diaphragm 9 has a smaller diameter than the upper diaphragm 8. The opening 7-2 at a lower end of the air chamber 6 to which the lower diaphragm 9 is mounted is also adapted to open with a smaller diameter than the opening 7-1 at the upper end of the air chamber 6 like the diameter of the lower diaphragm 9.

Thus, vertically opposite inner surfaces of the upper diaphragm 8 and the lower diaphragm 9 are pressurized surfaces that receive pressure of the air chamber 6, and these pressurized surfaces have different areas. Specifically, comparing the diameters of the upper diaphragm 8 and the lower diaphragm 9, the upper diaphragm 8 has the larger diameter, and comparing the diameters of the openings 7-1 and 7-2 to which the diaphragms 8 and 9 are respectively mounted, the opening 7-1 to which the upper diaphragm 8 is mounted has the larger diameter. Thus, in the flow control valve V according to the embodiment, the upper diaphragm 8 has a larger pressurized area than the lower diaphragm 9.

The upper diaphragm 8 and the lower diaphragm 9 are integrally connected by a connecting shaft 10 placed substantially in the center of the air chamber 6. A variety of connection structures between the upper diaphragm 8 and the lower diaphragm 9 by the connecting shaft 10 can be considered, and in the embodiment, the lower diaphragm 9 is formed integrally with an outer periphery of a lower end of the connecting shaft 10, and the upper diaphragm 8 is secured at substantially the center thereof to an upper end of the connecting shaft 10, thereby allowing the upper diaphragm 8 and the lower diaphragm 9 to be integrated with each other by the connecting shaft 10.

The connecting shaft 10 is supported slidably in an axial direction by a sliding bearing 11 provided as support means in the air chamber 6. The sliding bearing 11 is mounted and secured to a bearing securing portion 12 provided on an inner wall of the air chamber 6.

Air whose pressure or flow rate is controlled is supplied to the air chamber 6. A supply system of the air will be now described. In the flow control valve V according to the embodiment, an air supply passage 13 that communicates with the air chamber 6 is formed in a part of the middle housing 4, and the air whose pressure or flow rate is controlled is supplied from the outside through the air supply passage 13 into the air chamber 6. The air supplied into the air chamber 6 is adapted to be released through an orifice 14. The orifice 14 is provided in the middle of an air release passage 15 that connects the air chamber 6 and the outside.

A through hole 16 is provided in a peripheral surface of the valve cap 5, and the inner space of the valve cap 5 communicates with the outside via the through hole 16. A spring 17 is housed in the inner space of the valve cap 5. A lower end of the spring 17 is mounted via a spring bearing 18 to an upper surface of the upper diaphragm 8 that constitutes a bottom surface of the inner space of the valve cap 5. An upper end of the spring 17 is set so as to abut against an upper surface of the inner space of the valve cap 5.

The spring 17 always urges the upper diaphragm 8 downward, that is, in the direction of the lower diaphragm 9. Because the upper diaphragm 8 and the lower diaphragm 9 are integrally connected by the connecting shaft 10, the lower diaphragm 9 is also always urged downward by a force of the spring 17.

When air, for example, whose pressure is controlled is supplied into the air chamber 6 through the air supply passage 13, the pressure of the air equally acts on each pressurized surface of the upper diaphragm 8 and the lower diaphragm 9. This causes the upper diaphragm 8 to be pressed upward outside the air chamber 6. On the other hand, the lower diaphragm 9 is pressed downward outside the air chamber 6 contrary to the upper diaphragm 8.

At this time, the upper diaphragm 8 has the larger pressurized area than the lower diaphragm 9, and thus the upper diaphragm 8 has a larger force pressing the entire diaphragm toward the outside of the air chamber 6 than the lower diaphragm 9. Thus, a force obtained by subtracting a force applied to the lower diaphragm 9 from a force applied to the upper diaphragm 8 (hereinafter referred to as a differential force) acts on the connection structure constituted by the upper diaphragm 8, the lower diaphragm 9, and the connecting shaft 10.

When the differential force exceeds the force of the spring 17, the connection structure constituted by the upper diaphragm 8, the lower diaphragm 9, and the connecting shaft 10 is deformed and displaced upward against the force of the spring 17. Specifically, the upper diaphragm 8 is deformed and displaced so as to protrude upward outside the air chamber 6, which causes the connecting shaft 10 and the lower diaphragm 9 to be pulled upward, the connecting shaft 10 slides upward while being supported by the sliding bearing 11, and the lower diaphragm 9 is deformed and displaced upward so as to enter the inside of the air chamber 6.

The internal channel 19 is provided outside the air chamber 6. A fluid whose flow rate is to be controlled flows through the internal channel 19, and the internal channel 19 is drilled in the valve base 3 included in the valve housing 1. The internal channel 19 is adapted to pass through an outer surface 9a of the lower diaphragm 9.

Now, the internal channel 19 will be further described in detail. The internal channel 19 according to the embodiment includes a valve chamber 20 in which the valve body 2 is placed, and an upper passage 21 and a lower passage 22 that communicate with the valve chamber 20.

The valve chamber 20 is defined by a recess 3-1 formed in the upper surface of the valve base 3, and the lower diaphragm 9 that closes the surface of the recess 3-1, and the outer surface 9a of the lower diaphragm 9 directly faces the valve chamber 20.

Figure 2:
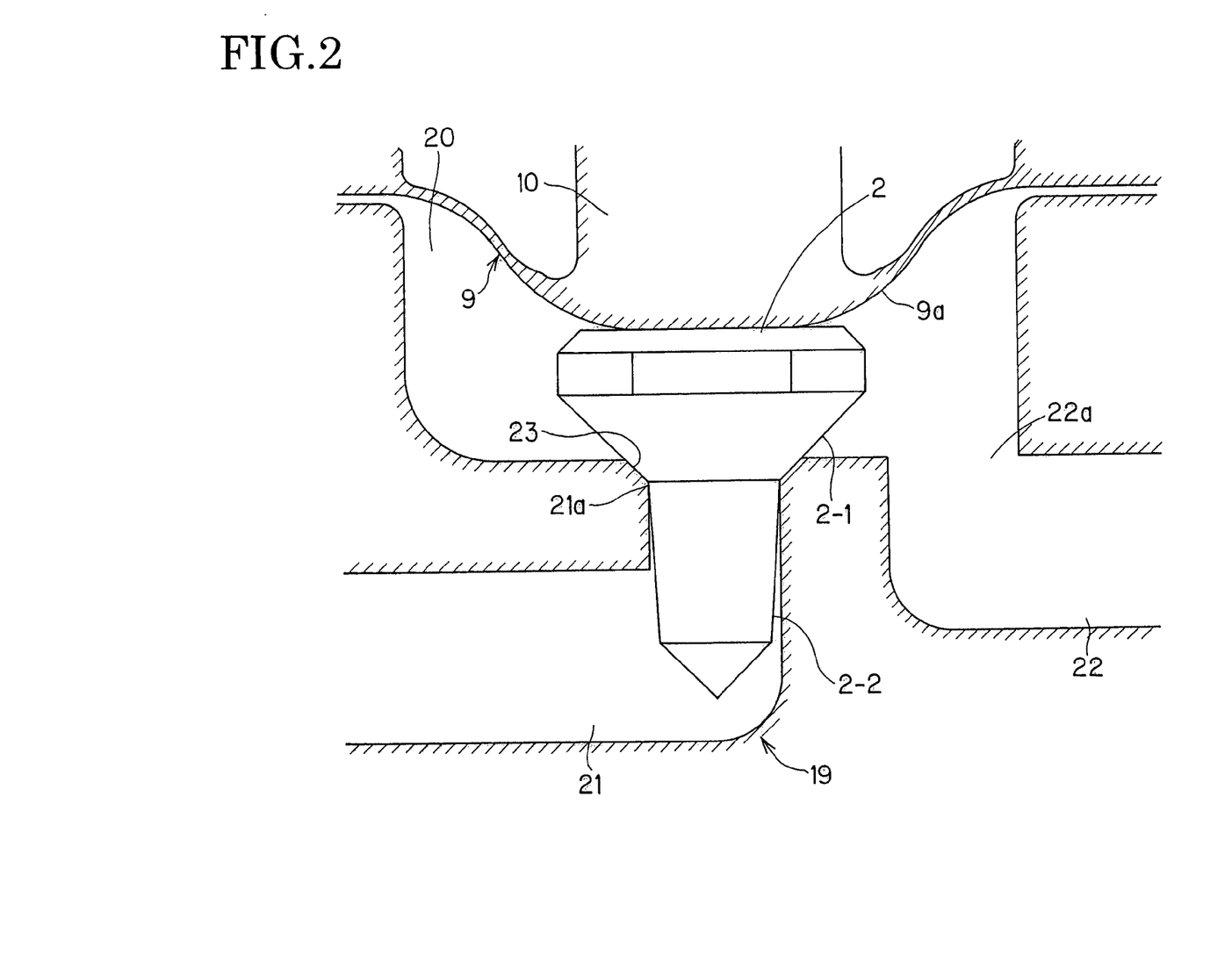
FIG. 2 is an enlarged view of a valve body and a periphery thereof in FIG. 1.

As shown in FIG. 2, one end 21a of the upper passage 21 that communicates with the valve chamber 20 is formed to open into a bottom surface of the valve chamber 20 from below the valve chamber 20, and be positioned on an extension of an axis of the connecting shaft 10. Then, a valve seat 23 of the valve body 2 is formed in an opening edge of one end of the upper passage 21. The other end 21b of the upper passage 21 communicates with and is connected to an upstream side of an unshown fluid supply system, that is, a fluid supply device that supplies the fluid.

One end 22a of the lower passage 22 that communicates with the valve chamber 20 is formed to open into the bottom surface of the valve chamber 20 from below the valve chamber 20. The other end 22b of the lower passage 22 communicates with and is connected to a downstream side of the unshown fluid supply system, that is, a fluid use device that uses the fluid. One end 22a of the lower passage 22 may open into a surface other than the bottom surface of the valve chamber 20 such as a side surface of the valve chamber 20.

The valve body 2 in the valve chamber 20 has a column shape with taper portions 2-1 and 2-2 of two steps in an outer periphery thereof, and is placed coaxially with the connecting shaft 10. The valve body 2 is placed beneath the lower end of the connecting shaft 10, and a rear end thereof is mounted integrally with the outer surface 9a of the lower diaphragm 9. For a mounting and securing structure of the valve body 2, in the embodiment, the rear end of the valve body 2 is screwed into and secured to the lower end surface of the connecting shaft 10 from the side of the outer surface 9a of the lower diaphragm 9. Thus, when the connecting shaft 10 vertically slides, the valve body 2 vertically slides in conjunction therewith along the extension axis of the connecting shaft 10.

The upper taper portion 2-1 of the valve body 2 abuts against the valve seat 23 to constitute a seal portion, and the lower taper portion 2-2 is adapted to enter the upper passage 21 below the valve seat 23.

When the valve body 2 slides upward from a state where the upper taper portion 2-1 in the outer periphery of the valve body 2 abuts against the valve seat 23 as shown in FIGS. 1 and 2, the upper taper portion 2-1 in the outer periphery of the valve body 2 is separated from the valve seat 23 to open the internal channel 19. At this time, the flow rate of the fluid flowing through the internal channel 19 increases or decreases in proportion to the amount of sliding of the valve body 2. This is because a gap around the valve body 2 increases by the amount of upward sliding of the valve body 2.

The flow control valve V in FIG. 1 has the structure in which the internal channel 19 passes through the outer surface of the lower diaphragm 9, and the outer surface 9a of the lower diaphragm 9 only comes into contact with the fluid. Thus, the outer surface 9a of the lower diaphragm 9 only is in danger of corrosion by the fluid, and corrosion-resistant means may be applied to the outer surface 9a only of the lower diaphragm 9.

The inner and outer surfaces of the upper diaphragm 8 comes into contact with air only and are in no danger of corrosion by the fluid, and thus may be made of relatively inexpensive rubber or the like. The lower diaphragm 9 and the connecting shaft 10 are made of fluorocarbon polymer, for example, PTFE (polytetrafluoroethylene), but may be made of other resins or metal.

When the lower diaphragm 9 is made of a material subject to corrosion such as metal, the outer surface 9a of the lower diaphragm may be coated with fluorocarbon polymer in order to prevent corrosion of the outer surface 9a of the lower diaphragm caused by the contact with the fluid.

Next, operations of the flow control valve configured as described above according to the embodiment will be described with reference to FIG. 1.

In the flow control valve V according to the embodiment, when the pressure of the air in the air chamber 6 is atmospheric pressure, or higher than the atmospheric pressure but lower than a predetermined value, the entire connection structure constituted by the upper diaphragm 8, the lower diaphragm 9, and the connecting shaft 10 is pressed downward by the force of the spring 17 and placed in the position in FIG. 1. At this time, the valve body 2 comes into close contact with the valve seat 23 to close the internal channel 19.

When the air of the pressure at the predetermined value of higher, that is, the air of the pressure sufficient for increasing the differential force more than the force of the spring 17 is supplied from the air supply passage 13 into the air chamber 6, the connection structure constituted by the upper diaphragm 8, the lower diaphragm 9, and the connecting shaft 10 is deformed and displaced upward against the force of the spring 17 by the differential force until the differential force matches the force of the spring 17. Specifically, the upper diaphragm 8 is deformed and displaced so as to protrude upward outside the air chamber 6, which causes the connecting shaft 10 and the lower diaphragm 9 to be pulled upward, the connecting shaft 10 slides upward while being supported by the sliding bearing 11, and the lower diaphragm 9 is deformed and displaced upward so as to enter the inside of the air chamber 6. The valve body 2 slides upward in conjunction with the upward sliding of the connecting shaft 10, and is separated from the valve seat 23 to open the internal channel 19.

Further increasing the pressure of the air supplied from the air supply passage 13 into the air chamber 6 increases the differential force, and thus increases the amounts of deformation of the upper diaphragm 8 and the lower diaphragm 9, and the amount of upward sliding of the connecting shaft 10 and the valve body 2 that sides in conjunction with the connecting shaft 10, which causes the valve body 2 to be further separated from the valve seat 23 to increase the gap around the valve body 2. This increases the flow rate of the fluid flowing through the internal channel 19. In order to reduce the flow rate of the fluid flowing through the internal channel 19, the pressure of the air supplied from the air supply passage 13 into the air chamber 6 may be controlled to be reduced.

As described above, according to the flow control valve V in FIG. 1, the difference between the forces applied to the upper diaphragm 8 and the lower diaphragm 9 causes the valve body 2 to slide, thereby increasing resolution of a slide stroke of the valve body 2 and allowing a flow adjustment with high accuracy.

The flow control valve V in FIG. 1 has a simple structure in which no isolated wall by means of an O-ring or the like is formed in the air chamber unlike a general air valve or the like, and the connecting shaft 10 of the upper diaphragm 8 and the lower diaphragm 9 is slidably supported by the sliding bearing 11 in the air chamber 6, and is inexpensive. The connecting shaft 10 slides while being supported by the sliding bearing 11, thereby providing little sliding resistance and allowing position control of the valve body 2 with high accuracy by minute air pressure, which is suitable for the flow adjustment with high accuracy.

The flow control valve V in FIG. 1 has the configuration in which the outer surface of the lower diaphragm 9 having the smaller pressurized area of the two diaphragms 8 and 9 having the different pressurized areas is placed so as to face the internal channel 19. Such a configuration has an advantage that the pressure of the fluid acts on the pressurized surface of the lower diaphragm 9 having the smaller pressurized area to reduce an influence of the pressure of the fluid, as compared with a configuration using diaphragms having the same pressurized areas.

Figure 3:
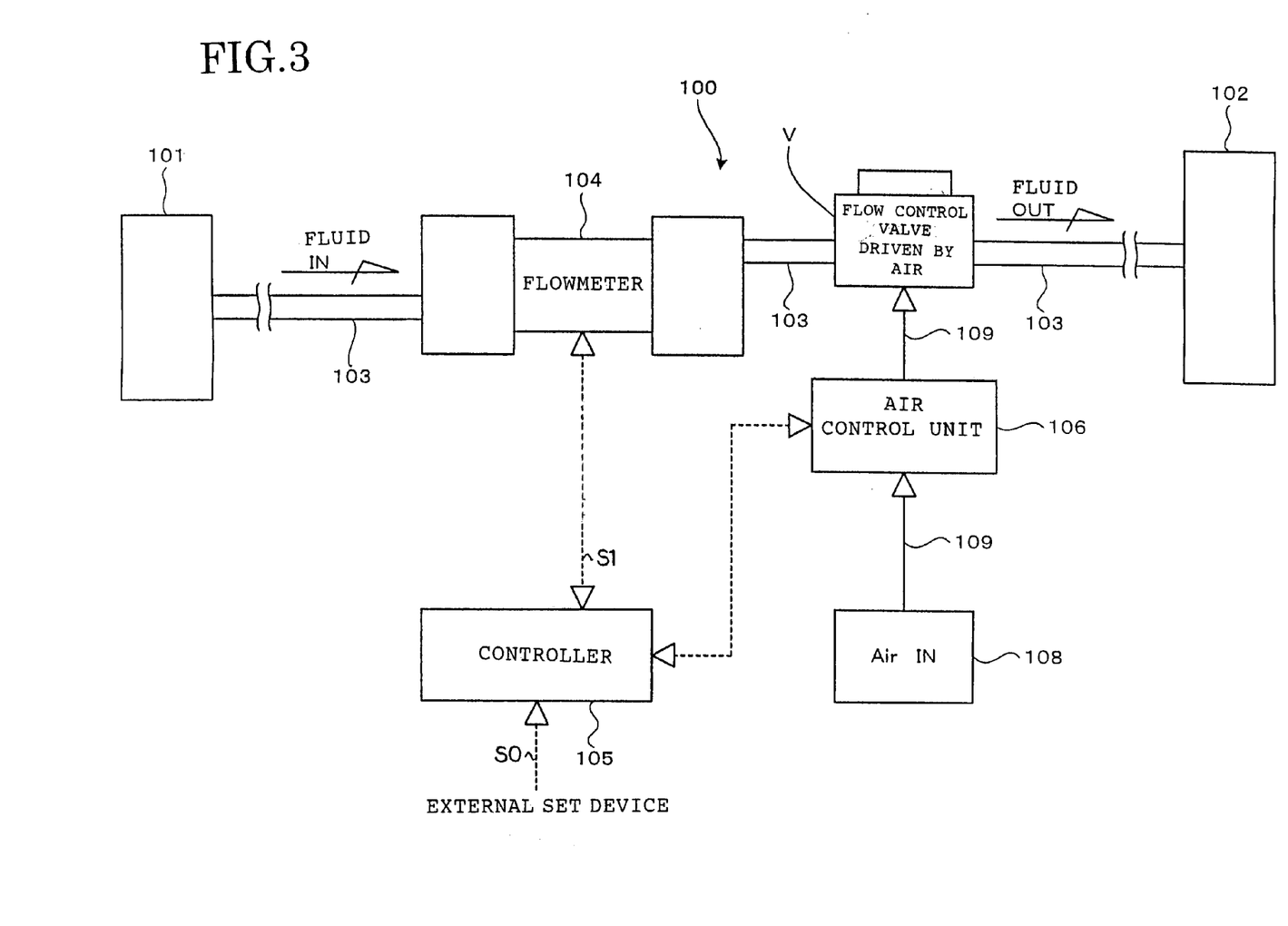
FIG. 3 illustrates a flow control device configured using the flow control valve in FIG. 1.

FIG. 3 illustrates a flow control device 100 configured using the flow control valve V in FIG. 1. In the flow control device 100 in FIG. 3, the flow control valve V in FIG. 1 and an ultrasonic flowmeter 104 are provided in the middle of a duct line 103 that supplies a fluid from a fluid supply device 101 to a fluid use device 102. Particularly in the embodiment, the ultrasonic flowmeter 104 is placed upstream of the flow control valve V.

Specifically, in the flow control device 100 in FIG. 3, the upper passage 21 (see FIG. 1) of the internal channel 19 provided in the flow control valve V is connected to the fluid supply device 101, the lower passage 22 (see FIG. 1) of the internal channel 19 is connected to the fluid use device 102, and the ultrasonic flowmeter 104 is placed in the duct line 103 that connects the fluid supply device 101 and the flow control valve V.

The fluid supply device 101 supplies the fluid to the fluid use device 102 via the flow control valve V. The fluid use device 102 may be considered as, for example, a device that uses a fluid of a suitably controlled flow rate for operation such as a cleaning device in a semiconductor manufacturing step.

The ultrasonic flowmeter 104 is of a type that ultrasonically measures a flow rate of a fluid. A basic principle thereof is that a difference between a transfer time of ultrasonic propagating in a flowing direction of the fluid in the duct line 103 (hereinafter referred to as "forward ultrasonic") and a transfer time of ultrasonic propagating in an opposite direction from the flowing direction of the fluid (hereinafter referred to as "reverse ultrasonic") is used to measure a propagation time of each ultrasonic and calculate a flow velocity of the fluid from a difference between propagation times.

Figure 5:
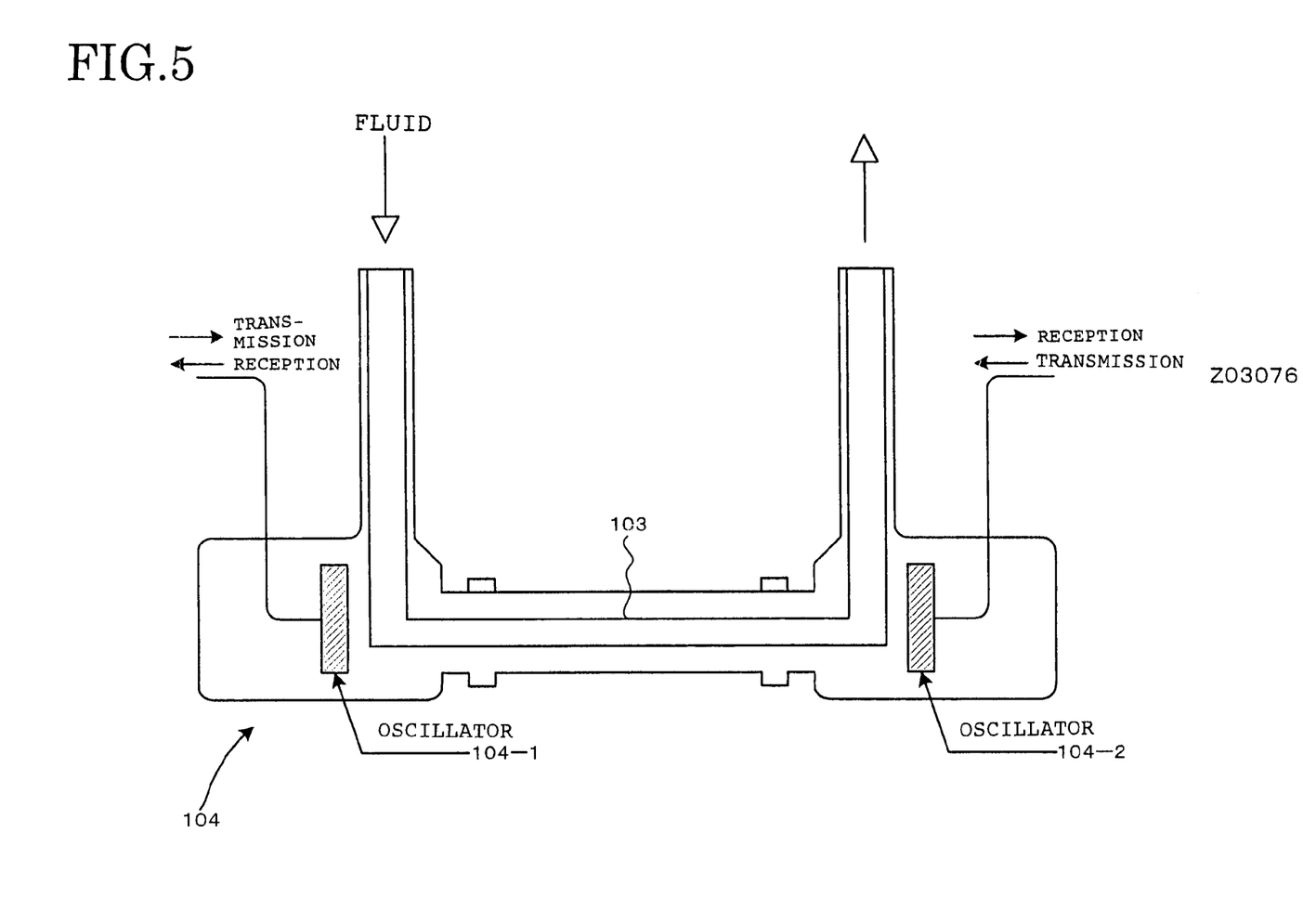
FIG. 5 is a schematic view of a configuration of an ultrasonic flowmeter used in the flow control device in FIGS. 1 and 2.

The ultrasonic flowmeter 104 that measures the flow rate of the fluid based on the basic principle is configured as schematically shown in FIG. 5. The ultrasonic flowmeter 104 in FIG. 5 includes two oscillators 104-1 and 104-2 placed opposite each other, and a part of the duct line 103 that connects the flow control valve V and the fluid supply device 101 is placed on a line segment connecting the two oscillators 104-1 and 104-2.

In the ultrasonic flowmeter 104, the forward ultrasonic transmitted from the upstream oscillator 104-1 is received by the downstream oscillator 104-2, and a time required for the forward ultrasonic to reach the downstream oscillator 104-2 from the upstream oscillator 104-1 is measured. Further, the reverse ultrasonic transmitted from the downstream oscillator 104-2 is received by the upstream oscillator 104-1, and a time required for the reverse ultrasonic to reach the upstream oscillator 104-1 from the downstream oscillator 104-2 is measured. Finally, the flow velocity of the fluid is calculated from the difference between the propagation times of the ultrasonic that is a difference between two time measurement values to determine the flow rate.

The flow control device 100 in FIG. 3 also includes a control system for controlling the flow control valve V. The control system controls the flow control valve V based on a flow measurement value measured by the ultrasonic flowmeter 104 and a flow set value randomly set by a user to control the flow rate of the fluid flowing through the duct line 103 so as to match the flow set value. As means for performing such flow control, the control system includes a controller 105 that performs mathematical operation processing and an air control unit 106 constituted by an electropneumatic regulator or a proportional solenoid valve.

To the controller 105, the present flow measurement value measured by the ultrasonic flowmeter 104 is input as a flow rate signal S1, and the flow set value set by the user is input as an external set signal S0. Then, the controller 105 compares the two input signals, that is, the flow rate signal S1 (the present flow measurement value) and the external set signal S0 (the flow set value), performs a PID operation relative to a deviation between the signals, and output a control signal to the air control unit 106. The external set signal S1 may be input via an unshown input portion of the controller 105.

The air control unit 106 is provided in the middle of air supply piping 109 that connects an air supply source 108 and the air supply passage 13 (see FIG. 1) of the flow control valve V, and adjusts pressure or a flow rate of air from the air supply source 108 to control pressure of air supplied into the air chamber 6 of the flow control valve V. The pressure control of the air is performed based on a control signal from the controller 105.

The pressure control of the air by the air control unit 106 will be described in detail. First, when the flow rate of the fluid flowing through the duct line 103 is lower than a desired flow set value, that is, when the present flow measurement value measured by the ultrasonic flowmeter 104 is lower than the flow set value, a control signal to increase the air pressure in the air chamber 6 of the flow control valve V by a predetermined amount is output from the controller 105 to the air control unit 106. This is because increased air pressure causes the entire connection structure constituted by the upper diaphragm 8, the lower diaphragm 9, and the connecting shaft 10 to be deformed and displaced upward in the flow control valve V, as compared with a state before the output of the control signal, and the valve body 2 slides upward in conjunction therewith to increase the gap around the valve body 2, thereby increasing the flow rate of the fluid downstream of the flow control valve V to approximate the flow set value.

On the other hand, when the flow rate of the fluid flowing through the duct line 103 is higher than the desired flow set value, that is, when the present flow measurement value measured by the ultrasonic flowmeter 104 is higher than the flow set value, a control signal to reduce the air pressure in the air chamber 6 of the flow control valve V by a predetermined amount is output from the controller 105 to the air control unit 106. This is because reduced air pressure causes the entire connection structure constituted by the upper diaphragm 8, the lower diaphragm 9, and the connecting shaft 10 to be deformed and displaced downward in the flow control valve V, as compared with a state before the output of the control signal, and the valve body 2 thus slides downward to reduce the gap around the valve body 2, thereby reducing the flow rate of the fluid downstream of the flow control valve V to approximate the flow set value.

As described above, the flow control device 100 according to the embodiment controls the flow control valve V based on the present flow measurement value flowing through the duct line 103 to adjust the flow rate of the fluid constant so as to match the flow set value, and thus keeping the flow rate constant can be sufficiently accommodated even when the flow rate of the fluid changes by factors other than the flow rate.

Figure 4:
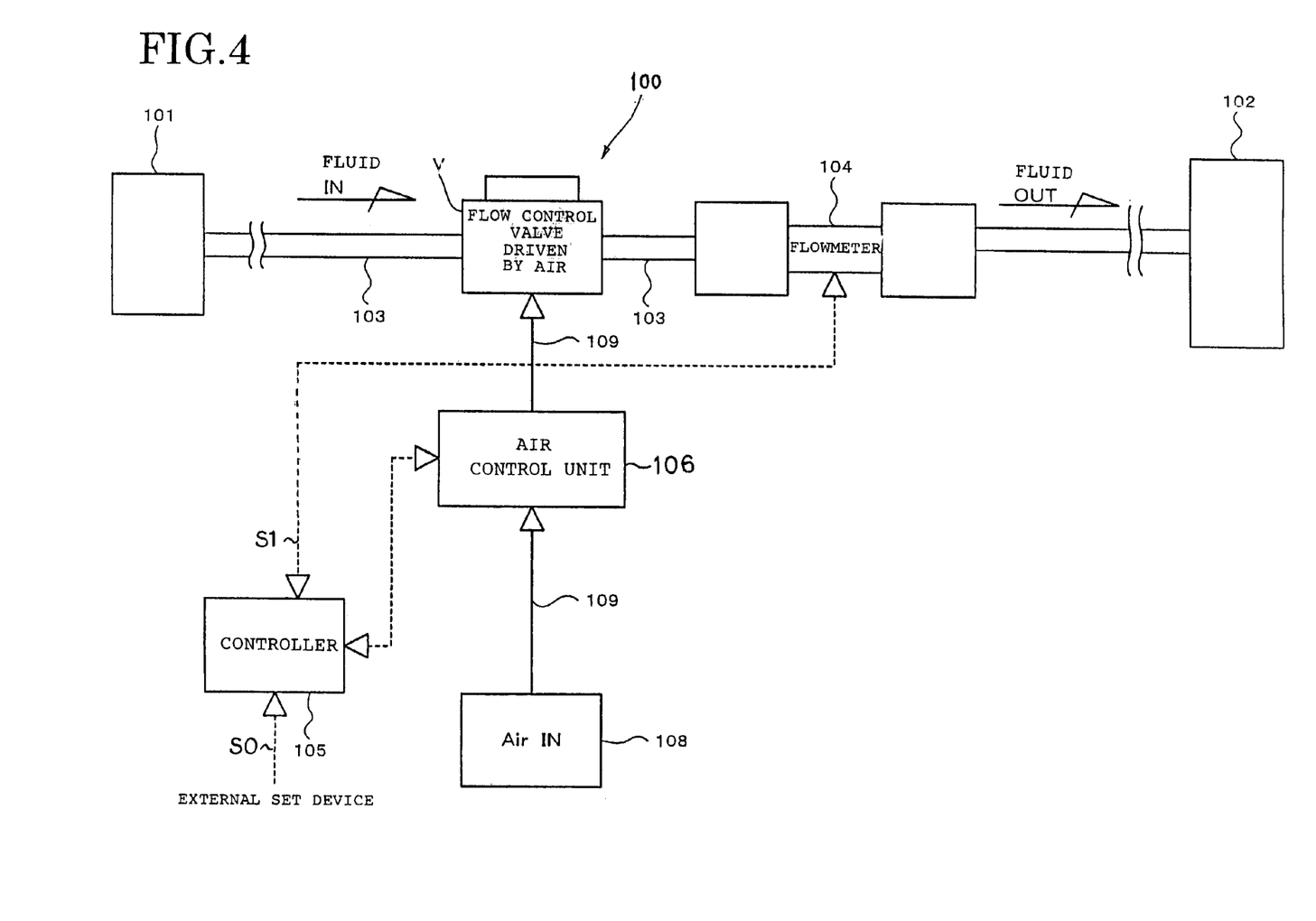
FIG. 4 illustrates another flow control device configured using the flow control valve in FIG. 1.

In the flow control device in FIG. 3, the ultrasonic flowmeter 104 is placed upstream of the flow control valve V, but as shown in FIG. 4, the ultrasonic flowmeter 104 may be placed downstream of the flow control valve V. Such a configuration has an advantage that even if the lower diaphragm is damaged, the damage of the diaphragm can be detected at an early stage.

Specifically, the ultrasonic flowmeter has a function of raising an alarm about abnormal measurement when the measurement cannot be performed. In the flow control valve V in FIG. 1 included in the flow control device in FIG. 4, the lower diaphragm 9 is damaged, the air in the air chamber 6 leaks from the damaged portion into the internal channel 19, and bubbles of the leaking air enter the fluid flowing through the internal channel 19, that is, the fluid whose flow rate is to be measured. The bubbles prevent ultrasonic propagation by the ultrasonic flowmeter 104 and thus measurement, and the alarm about the abnormal measurement is raised. This allows some abnormality occurring in the lower diaphragm 9 to be immediately detected.

The flow control device 100 in FIGS. 3 and 4 is the example in which the flow control valve V in FIG. 1 is placed in the middle of the duct line 103 that supplies the fluid from the fluid supply device 101 to the fluid use device 102, but as an alternative example, the flow control valve in FIG. 1 or the flow control device 100 in FIGS. 3 and 4 may be integrated as a unit into a cleaning device such as in a semiconductor manufacturing field. In this case, the flow control valve V or the flow control device 100 is placed as a unit in the middle of a duct line that supplies a chemical solution to a cleaning step in the cleaning device or the like, that is, a chemical solution supply line, and the chemical solution is dispensed to a use step of the chemical solution via the unit.

In the embodiment, the example of the lower diaphragm 9 and the connecting shaft 10 integrally formed are described, but the lower diaphragm 9 and the connecting shaft 10 may be formed as separate parts, and integrally connected by fastening means such as a screw.

The flow control device and the flow control valve included in the flow control device according to the invention are used for a variety of devices that suitably control a flow rate of a fluid to supply the fluid, such as a flow control unit or the like in a semiconductor manufacturing apparatus. The semiconductor manufacturing apparatus includes various steps of handling a fluid other than a cleaning step, and the flow control device according to the invention may be used in the steps of handling the fluid other than the cleaning step. Besides the semiconductor manufacturing field, the flow control device and the flow control valve included in the flow control device according to the invention may be used in various fields that require suitable control of a flow rate of a fluid including chemical and pharmaceutical fields.

When the flow control device according to the invention is used in chemical or pharmaceutical manufacturers, an electric component such as a controller 105 may be placed in a position other than an explosion proof line.

What is claimed is:

1. A flow control valve comprising:
an air chamber having two openings opposite each other;

two diaphragms mounted to the openings of said air chamber and having pressurized surfaces with different areas that receive pressure of the air chamber;

a connecting shaft that connects said two diaphragms;

support means that supports said connecting shaft slidably in an axial direction;

an internal channel that is provided outside said air chamber and through which a fluid flows;

a valve body that slides in conjunction with the sliding operation of said connecting shaft to increase or decrease a flow rate of the fluid flowing through said internal channel; and an air supply passage that supplies air whose pressure or flow rate is controlled into said air chamber, wherein said air supply passage is divided at one end thereof into two branch duct lines, one of the two branch duct lines opens at an outlet thereof so as to face the pressurized surface of one of said diaphragms in close proximity, and the other of the branch duct lines opens at an outlet thereof so as to face the pressurized surface of the other of said diaphragms in close proximity.

2. The flow control valve according to claim 1, wherein said connecting shaft and said support means are placed in said air chamber.

3. The flow control valve according to claim 1, wherein said valve body is mounted to an outer surface of one of said two diaphragms, and said internal channel is adapted to pass through the outer surface of said one diaphragm to which said valve body is mounted.

4. The flow control valve according to claim 3, wherein the outer surface of said one diaphragm is protected by corrosion-resistant means such as fluorocarbon polymer.

5. A flow control valve comprising:

an air chamber having upper and lower openings;

upper and lower diaphragms mounted to the upper and lower openings of said air chamber and having pressurized surfaces with different areas that receive pressure of the air chamber;

a connecting shaft that connects said upper and lower diaphragms;

support means that supports said connecting shaft slidably in an axial direction;

an internal channel that is provided outside said air chamber and through which a fluid flows;

a valve body that slides in conjunction with the sliding operation of said connecting shaft to increase or decrease a flow rate of the fluid flowing through said internal channel; and an air supply passage that supplies air whose pressure or flow rate is controlled into said air chamber, wherein said air supply passage is divided at one end thereof into two branch duct lines, one of the two branch duct lines opens at an outlet thereof so as to face the pressurized surface of said upper diaphragm in close proximity, and the other of the branch duct lines opens at an outlet thereof so as to face the pressurized surface of said lower diaphragm in close proximity.

6. The flow control valve according to claim 5, wherein said connecting shaft and said support means are placed in said air chamber.

7. The flow control valve according to claim 5, wherein said valve body is mounted to an outer surface of one of said two diaphragms, and said internal channel is adapted to pass through the outer surface of said one diaphragm to which said valve body is mounted.

8. The flow control valve according to claim 6, wherein the outer surface of said one diaphragm is protected by corrosion-resistant means such as fluorocarbon polymer.

9. A flow control device comprising:

a duct line that supplies a fluid;

a flow control valve placed in the middle of said duct line;

a flowmeter that measures a flow rate of the fluid passing through said duct line; and a control unit that controls said flow control valve based on a flow measurement value measured by said flowmeter and a flow set value to adjust the flow rate of the fluid flowing through said duct line so as to match said flow set value, wherein said flow control valve comprises:

an air chamber having two openings opposite each other;

two diaphragms mounted to the openings of said air chamber and having pressurized surfaces with different areas that receive pressure of the air chamber;

a connecting shaft that connects said two diaphragms;

support means that supports said connecting shaft slidably in an axial direction;

an internal channel that is provided outside said air chamber and communicates with said duct line and through which the fluid flowing through said duct line flows;

a valve body that slides in conjunction with the sliding operation of said connecting shaft to increase or decrease a flow rate of the fluid flowing through the internal channel; and an air supply passage that supplies air whose pressure or flow rate is controlled into said air chamber, wherein said air supply passage is divided at one end thereof into two branch duct lines, one of the two branch duct lines opens at an outlet thereof so as to face the pressurized surface of one of said diaphragms in close proximity, and the other of the branch duct lines opens at an outlet thereof so as to face the pressurized surface of the other of said diaphragms in close proximity.

10. The flow control device according to claim 9, wherein said flowmeter is an ultrasonic flowmeter and placed downstream of said flow control valve.

11. The flow control device according to claim 9, wherein said connecting shaft and said support means are placed in said air chamber.

12. The flow control device according to claim 9, wherein said valve body is mounted to an outer surface of one of said two diaphragms, and said internal channel is adapted to pass through the outer surface of said one diaphragm to which said valve body is mounted.

13. The flow control device according to claim 12, wherein the outer surface of said one diaphragm is protected by corrosion-resistant means such as fluorocarbon polymer.

14. A flow control device comprising:

a duct line that supplies a fluid;

a flow control valve placed in the middle of said duct line;

a flowmeter that measures a flow rate of the fluid passing through said duct line; and a control unit that controls said flow control valve based on a flow measurement value measured by said flowmeter and a flow set value to adjust the flow rate of the fluid flowing through said duct line so as to match said flow set value, wherein said flow control valve comprises:

an air chamber having upper and lower openings;

upper and lower diaphragms mounted to the upper and lower openings of said air chamber and having pressurized surfaces with different areas that receive pressure of the air chamber;

a connecting shaft that connects said upper and lower diaphragms;

support means that supports said connecting shaft slidably in an axial direction;

an internal channel that is provided outside said air chamber and communicates with said duct line and through which the fluid flowing through said duct line flows;

a valve body that slides in conjunction with the sliding operation of said connecting shaft to increase or decrease a flow rate of the fluid flowing through said internal channel; and an air supply passage that supplies air whose pressure or flow rate is controlled into said air chamber, wherein said air supply passage is divided at one end thereof into two branch duct lines, one of the two branch duct lines opens at an outlet thereof so as to face the pressurized surface of said upper diaphragm in close proximity, and the other of the branch duct lines opens at an outlet thereof so as to face the pressurized surface of said lower diaphragm in close proximity.

15. The flow control device according to claim 14, wherein said flowmeter is an ultrasonic flowmeter and placed downstream of said flow control valve.

16. The flow control device according to claim 14, wherein said connecting shaft and said support means are placed in said air chamber.

17. The flow control device according to claim 14, wherein said valve body is mounted to an outer surface of one of said two diaphragms, and said internal channel is adapted to pass through the outer surface of said one diaphragm to which said valve body is mounted.

18. The flow control device according to claim 17, wherein the outer surface of said one diaphragm is protected by corrosion-resistant means such as fluorocarbon polymer.

* * * * *